United States Patent
Matsuyama et al.

(10) Patent No.: US 8,814,251 B2
(45) Date of Patent: Aug. 26, 2014

(54) UNDER COVERS FOR VEHICLE BODY

(75) Inventors: Shohei Matsuyama, Utsunomiya (JP); Daisuke Nakamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/997,418

(22) PCT Filed: Dec. 14, 2011

(86) PCT No.: PCT/JP2011/078883
§ 371 (c)(1),
(2), (4) Date: Jun. 24, 2013

(87) PCT Pub. No.: WO2012/111228
PCT Pub. Date: Aug. 23, 2012

(65) Prior Publication Data
US 2013/0278011 A1      Oct. 24, 2013

(30) Foreign Application Priority Data

Feb. 17, 2011   (JP) ................................. 2011-032413

(51) Int. Cl.
*B62D 35/02*   (2006.01)
*B62D 25/20*   (2006.01)

(52) U.S. Cl.
CPC .............. *B62D 35/02* (2013.01); *B62D 25/20* (2013.01)
USPC ..................... 296/180.1; 296/181.5; 180/69.1

(58) Field of Classification Search
CPC .............................. B62D 35/007; B62D 35/02
USPC ............... 296/38, 180.1, 180.2, 180.4, 181.5, 296/193.07, 204; 180/69.1, 903
See application file for complete search history.

(56) References Cited

U.S. PATENT DOCUMENTS 4,569,551 A      2/1986  Rauser et al.
4,772,060 A  *   9/1988  Kretschmer ............... 296/180.1
(Continued)

FOREIGN PATENT DOCUMENTS

JP      60-008166 A      1/1985
JP      H1-145678        10/1989
(Continued)

OTHER PUBLICATIONS

International Search Report from International Application PCT/JP2011/078883, mailing date Mar. 19, 2012.
(Continued)

*Primary Examiner* — Glenn Dayoan
*Assistant Examiner* — Jason S Daniels
(74) *Attorney, Agent, or Firm* — Carrier Blackman & Associates, P.C.; William D. Blackman; Joseph P. Carrier

(57) ABSTRACT

Under covers for a vehicle body are attached to a lower surface of the vehicle body in such a manner that, as seen in a direction of travel of a vehicle, the under covers are arranged at positions in front of rear wheels and in at least a rear half of a lower surface of the vehicle body. Recessed grooves are formed in pairs in a surface of an under cover body that faces a road surface, and are arranged so as face each other across a widthwise center of the vehicle, and gradually approach closer to each other as they extend rearward in the direction of travel of the vehicle. Rear ends of these grooves are located between the left and right rear wheels and are directed to the widthwise center of the vehicle.

5 Claims, 7 Drawing Sheets

(56) References Cited

U.S. PATENT DOCUMENTS 5,322,340 A * 6/1994 Sato et al. ............... 296/180.1
6,726,273 B2 * 4/2004 Kruschhausen et al. ...... 296/204

FOREIGN PATENT DOCUMENTS

| JP | 2006-062494 A | 3/2006 |
| JP | 2006-298312 A | 11/2006 |
| JP | 2007-112340 A | 5/2007 |
| JP | 2008-265677 A | 11/2008 |
| JP | 2009-090681 A | 4/2009 |
| JP | 2010-264883 A | 11/2010 |
| WO | WO 2011114509 A1 * | 9/2011 |

OTHER PUBLICATIONS

Notice of Allowance issued in Japanese Patent Application 2012-557794, mailing date Dec. 20, 2013.

* cited by examiner

UNDER COVERS FOR VEHICLE BODY

TECHNICAL FIELD

The present invention relates to under covers for a vehicle body.

The present application is based upon and claims the benefit of priority from prior Japanese Patent Application No. 2011-032413 filed in Japan on Feb. 17, 2011, the content of which is incorporated herein by reference.

BACKGROUND ART

In vehicles such as automobiles, there is a vehicle fitted with an under cover on a lower surface of the vehicle body in order to improve the aerodynamic characteristic of the vehicle. For example, the under cover includes a rectifying fin that protrudes downward under the floor of the vehicle body in order to stabilize the flow of air under the floor of the vehicle body. The rectifying fin has a blade thickness in the vehicle width direction, and is provided under the floor and formed to rise on a rear side of the rear wheels (refer to Patent Document 1).

Moreover, there is an under cover in which a rectifying protrusion that rectifies the air flow flowing on a rear surface of the under cover so as to flow at a lower position, is provided on the front side of a suspension component, under the floor in front of the rear wheels, in order to alleviate collision of the air flow flowing under the floor with the rear suspension component (refer to Patent Document 2).

RELATED ART DOCUMENTS

Patent Documents

Patent Document 1: Japanese Unexamined Patent Application, First Publication No. 2009-90681
Patent Document 2: Japanese Unexamined Patent Application, First Publication No. 2008-265677

DISCLOSURE OF INVENTION

Problems to be Solved by the Invention

However, in the former and latter conventional techniques, because the rectifying fin and the rectifying protrusion protrude downward from the under cover, a minimum ground clearance needs to be set between the end of the rectifying fin or the rectifying protrusion and the road surface, so that the protruding portion does not interfere with the road surface. As a result, the distance between an under cover body and the road surface becomes large, and it becomes a disadvantage in increasing the flow rate over the lower surface of the entire cover.

When the height of the cover body is lowered, the rectifying fin and the rectifying protrusion interfere with the road surface, and the under cover may be damaged.

In view of the above situation, it is an object of the present invention to provide under covers for a vehicle body in which the under cover body can be arranged at a low position, and the problem of interference of a rectifying element with the road surface can be solved.

Means for Solving the Problem (1) In order to achieve the above object, one aspect of the present invention is under covers for a vehicle body, attached to a lower surface of the vehicle body in such a manner that, as seen in a direction of travel of a vehicle, the under covers are arranged at positions in front of rear wheels and in at least a rear half of a lower surface of the vehicle body. Recessed grooves are formed in pairs in a surface of an under cover body that faces a road surface, and are arranged so as to face each other across a widthwise center of the vehicle, and gradually approach closer to each other as they extend rearward in the direction of travel of the vehicle. Rear ends of these grooves are located between the left and right rear wheels and are directed to the widthwise center of the vehicle.

(2) In the aspect of (1) described above, a recess may be formed in the surface of the under cover body that faces the road surface, at a position in front of the rear wheels, and a rear wall of the recess may be formed so as to be along an outer periphery of the rear wheels.

(3) In the aspect of (1) or (2) described above, the under cover body may be curved so as to be upwardly convex from a front side of the vehicle body toward a rear side.

(4) In any of the aspects of (1) to (3) described above, the under cover body may be attached to a rear half of a lower surface of the vehicle body in front of the rear wheels, that is continuous to a flat floor panel attached to a front half of the lower surface of the vehicle body in front of the rear wheels.

(5) In any of the aspects of (1) to (4) described above, a concave-shaped portion may be formed at an outside edge of the under cover body, and a bottom wall of the concave-shaped portion may be fixed to a side sill of the vehicle as a fixing portion.

Advantageous Effects of the Invention

According to the aspect of (1), a general surface, other than the grooves, of the surface of the under cover body that faces the road surface, is located close to the road surface to rectify the air flow, so that the air flows into the recessed grooves to create a contracted flow between the left and right rear wheels, thereby enabling to reduce air resistance of the vehicle. At this time, protruding components for flow rectification need not be set separately from the under cover body. Therefore the general surface of the under cover body can be lowered. Accordingly, the flow rate of air flowing between the under cover body and the ground can be increased while preventing damage to the under cover body, and hence the air resistance can be reduced.

According to the aspect of (2), the air flowing under the general surface of the under cover body that faces the road surface is caused to flow downward of the rear wheels from the recess via the rear wall of the recess, to avoid collision with the front surface of the rear wheels, thereby enabling to reduce turbulence and reduce the air resistance. Accordingly, damage to the recess that is indented from the general surface can be prevented.

According to the aspect of (3), because the under cover body is curved so as to be upwardly convex, a portion having a large distance from the road surface can be created from the front side toward the rear side, thereby improving the air introducing effect. Moreover, the air flow can be straightened by locating the general surface closer to the road surface by the increased depth.

According to the aspect of (4), because the under cover body is attached to the rear half of the lower surface of the vehicle body in front of the rear wheels, cost reduction can be realized as compared to a case in which the under cover body is provided over the whole surface on the lower side of the floor panel.

According to the aspect of (5), the portion other than the bottom of the concave-shaped portion serving as the fixing portion that is fixed to the side sill can be located at a lower position closer to the ground than the general surface of the floor panel. Accordingly, the flow rate of the air flow can be increased and the air resistance reduction effect can be increased.

DESCRIPTION OF EMBODIMENTS

Next is a description of an embodiment of the present invention based on the drawings.

Figure 1:
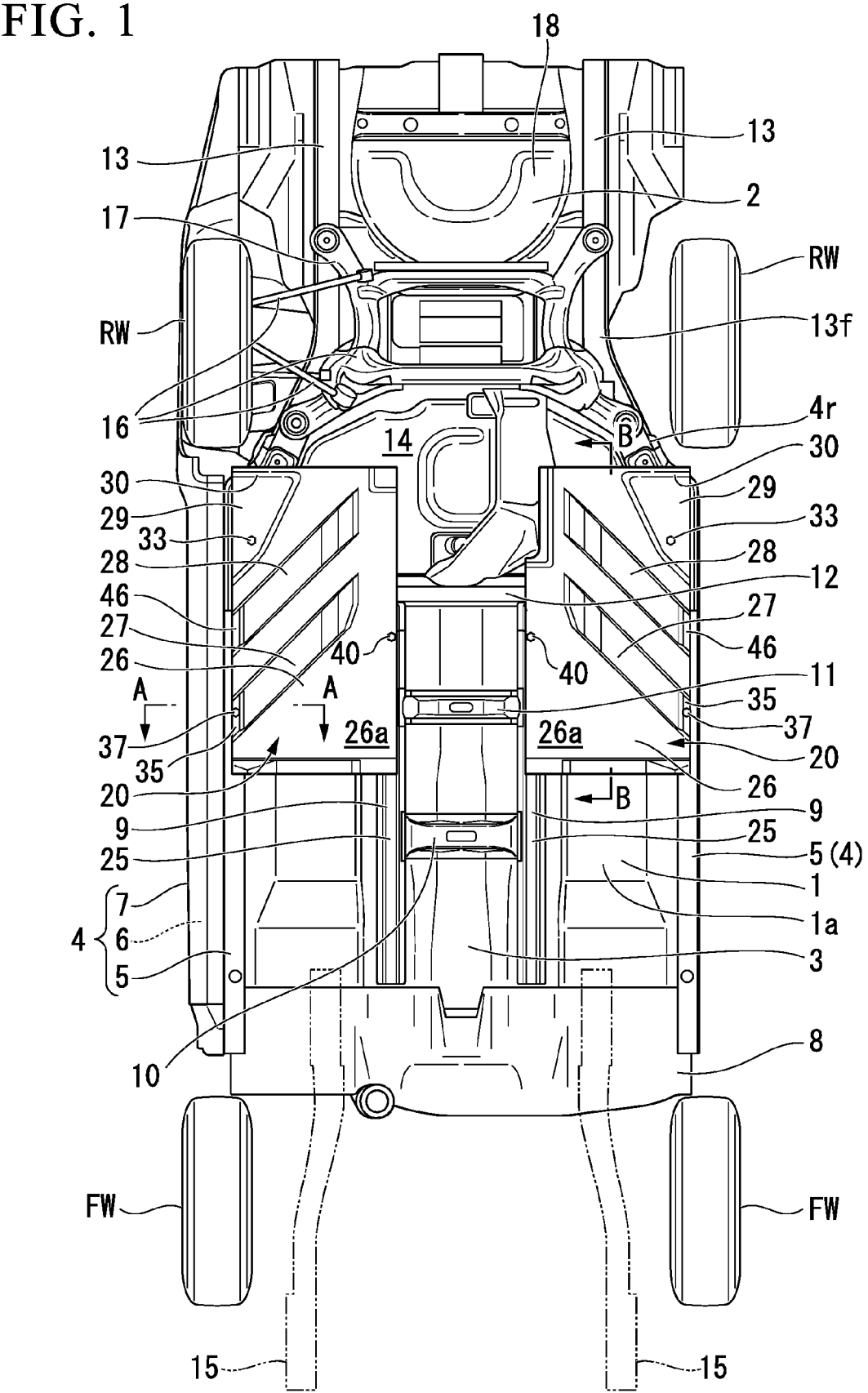
FIG. 1 is a bottom view of a vehicle body according to an embodiment of the present invention.

As shown in the bottom view of FIG. 1, a vehicle body floor includes a front floor 1 on the front side of the vehicle body, and a rear floor 2 on the rear side of the vehicle body connected to the front floor 1. A floor tunnel 3 is formed in an upward expanded condition at the vehicle widthwise center of the front floor 1 along a front-back direction of the vehicle. Side sills 4, which are structural parts of the vehicle, are fitted to the opposite sides of the front floor 1. The side sill 4 is formed in a closed cross-section structure by an inside sill 5 and a stiffener 6, and an outer panel 7 is joined to the outside of the side sill 4.

Here in FIG. 1, the right side of the front floor 1 shows the inside sill 5, and the left side of the front floor 1 shows the outer panel 7 that constitutes a side wall of the vehicle body that covers the inside sill 5 and the stiffener 6 from outside.

A dashboard lower panel 19 (see FIG. 4) that stands upward, is joined to the front end of the front floor 1, and a dashboard cross member 8 is joined to the rear side of a connecting portion of the front floor 1 and the dashboard lower panel 19. Tunnel frames 9 having a hat-shaped sectional shape that form a closed cross-section structure with the front floor 1, are joined to the rear surface of the front floor 1, on the opposite sides of the floor tunnel 3 along the front-back direction of the vehicle. Moreover, tunnel reinforcing members 10 and 11 are fitted to the rear side of the floor tunnel 3 along the vehicle widthwise direction so as to span over the tunnel frames 9.

A joining portion between the rear end of the front floor 1 and the rear floor 2 becomes high towards the rear, and a middle cross member 12 that forms the closed cross-section structure over the vehicle widthwise direction is joined to the rear side of the joining portion.

Rear frames 13 having a closed cross-section structure, are arranged on the left and right of the rear surface of the rear floor 2 along the front-back direction of the vehicle body. The rear frames 13 are provided at a higher position than the side sills 4 with an arrangement interval narrower than that of the side sills 4. The rear frame 13 is formed inclined outward and downward as a front portion 13f extends forward, and a rear portion 4r of the side sill 4 is joined to the front portion 13f of the rear frame 13. Here, a fuel tank 14 is arranged downward of the front of the rear floor 2 that is arranged at a higher position than the front floor 1.

Front side frames 15 are provided on the left and right of the front side of the vehicle body along the front-back direction thereof, and front wheels FW are arranged on the opposite sides of the front side frames 15. Moreover, a sub-frame 17 provided with a suspension member 16 that supports the left and right rear wheels RW, is fitted to the rear frame 13 from the underneath thereof. A spare tire pan 18 is formed in a downward expanded condition at the rear part of the rear floor 2.

Here, a pair of integrally formed vehicle-body under covers 20 made of resin are respectively fitted to the opposite sides of the floor tunnel 3 in a region from between the front tunnel reinforcing member 10 and the rear tunnel reinforcing member 11 on the front floor 1 (from the center of the wheel base) to a position in front of the rear wheels RW on the rear floor 2, that is, on the rear half of the lower surface of the vehicle body in front of the rear wheels RW.

Here, the left and right vehicle-body under covers 20 are substantially symmetrical to each other. Because the functional structures thereof are the same, like reference symbols refer to like parts in the description below.

Figure 2:
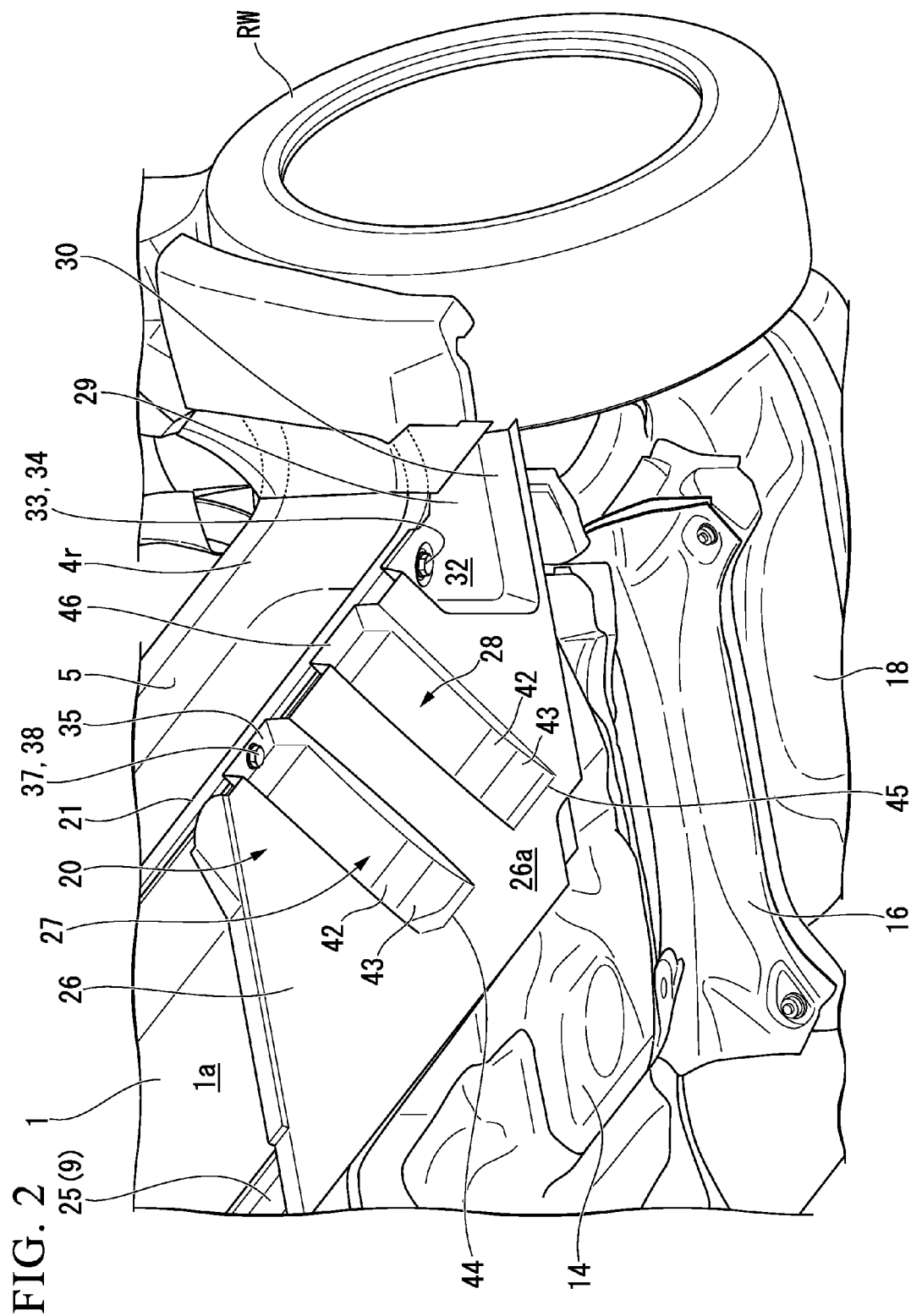
FIG. 2 is a partially cutaway perspective view of a relevant part of the present embodiment looking rearward and upward from the bottom left.

Also as shown in FIG. 2, the outside edge of the vehicle-body under cover 20 extends up to the near side of a flange 22 (refer to FIG. 4) of a lower wall 21 at a rear part of the inside sill 5, and reaches the vicinity of the widthwise center of the rear wheels RW. Moreover, inside edges of the vehicle-body under covers 20 respectively extend to an outer edge of a lower wall 25 of the tunnel frames 9.

The vehicle-body under cover 20 includes an under cover body 26 including a flat general surface 26a continuous to a rear edge of a flat general surface 1a of the front floor 1. A front groove 27 and a rear groove 28 respectively having a concave shape that are gradually directed to the widthwise center of the left and right rear wheels RW and extend diagonally towards the rear side in the direction of travel of the vehicle, are formed in the surface of the under cover body 26 that faces the road surface.

The front groove 27 and the rear groove 28 are arranged in parallel to each other, and respective rear ends continue to the general surface 26a via inclined portions 42 and 43 so that the depths of the grooves gradually become shallow. The rear end edges of the front groove 27 and the rear groove 28 continue to the general surface 26a by polygonal lines 44 and 45 extending in the front-back direction. However, the polygonal line 44 of the front groove 27 is machined diagonally so that the front side opens outward.

A recessed section (concave-shaped portion) 35 indented more than the front groove 27 is provided at the front of the front groove 27 of the under cover body 26 and on the outside edge of the under cover body 26. A recessed portion (concave-shaped portion) 46 indented more than the rear groove 28 is provided at the front of the rear groove 28 of the under cover body 26. The side walls of these recessed portions 35 and 46 are directed to the outside edge of the under cover body 26 to allow air to flow in from the side thereof.

Consequently, the matched pair of respective front grooves 27 and respective rear grooves 28 of the vehicle-body under covers 20 are arranged close to each other on the rear side in the direction of travel of the vehicle, being directed to the widthwise center of the left and right rear wheels RW.

The reason why the recessed sections 35 and 46 are indented is that the side of the front floor 1 inclines diagonally upward and is joined to the inside sill 5 (see FIG. 4), and hence, the outside edge of the under cover body 26 fixed by the lower wall 21 of the inside sill 5 needs to match with the front floor 1. Consequently, the outside edge of the front end of the under cover body 26 is indented diagonally, matched with the side of the front floor 1 inclined diagonally upward.

A recess 29 with a rear side along the rear end of the under cover body 26, an outer side along the outside edge of the under cover body 26, and an inner side slightly bent to the inside and along the rear groove 28, is formed in the surface facing the road surface, at a position in front of the rear wheels RW, on the rear side of the rear groove 28 of the under cover body 26, indented from the general surface 26*a* of the under cover body 26. The recess 29 includes a rear wall 30 formed along an outer periphery of the rear wheel RW. A bottom wall 32 of the recess 29 is formed flat.

The air flowing under the under cover body 26 flows rearward between the rear wheels RW because of the front groove 27 and the rear groove 28. However, the air flowing rearward not along the front groove 27 and the rear groove 28 and flowing into the recess 29 flows along the rear wall 30 and downwards, so as not to collide with the front surface of the rear wheels RW.

A fixing hole 34 for fixing the rear outside edge of the under cover body 26 to the lower wall 21 of the inside sill 5 by a bolt 33, is provided on the front side of the bottom wall 32 of the recess 29 in the under cover body 26.

Figure 3:
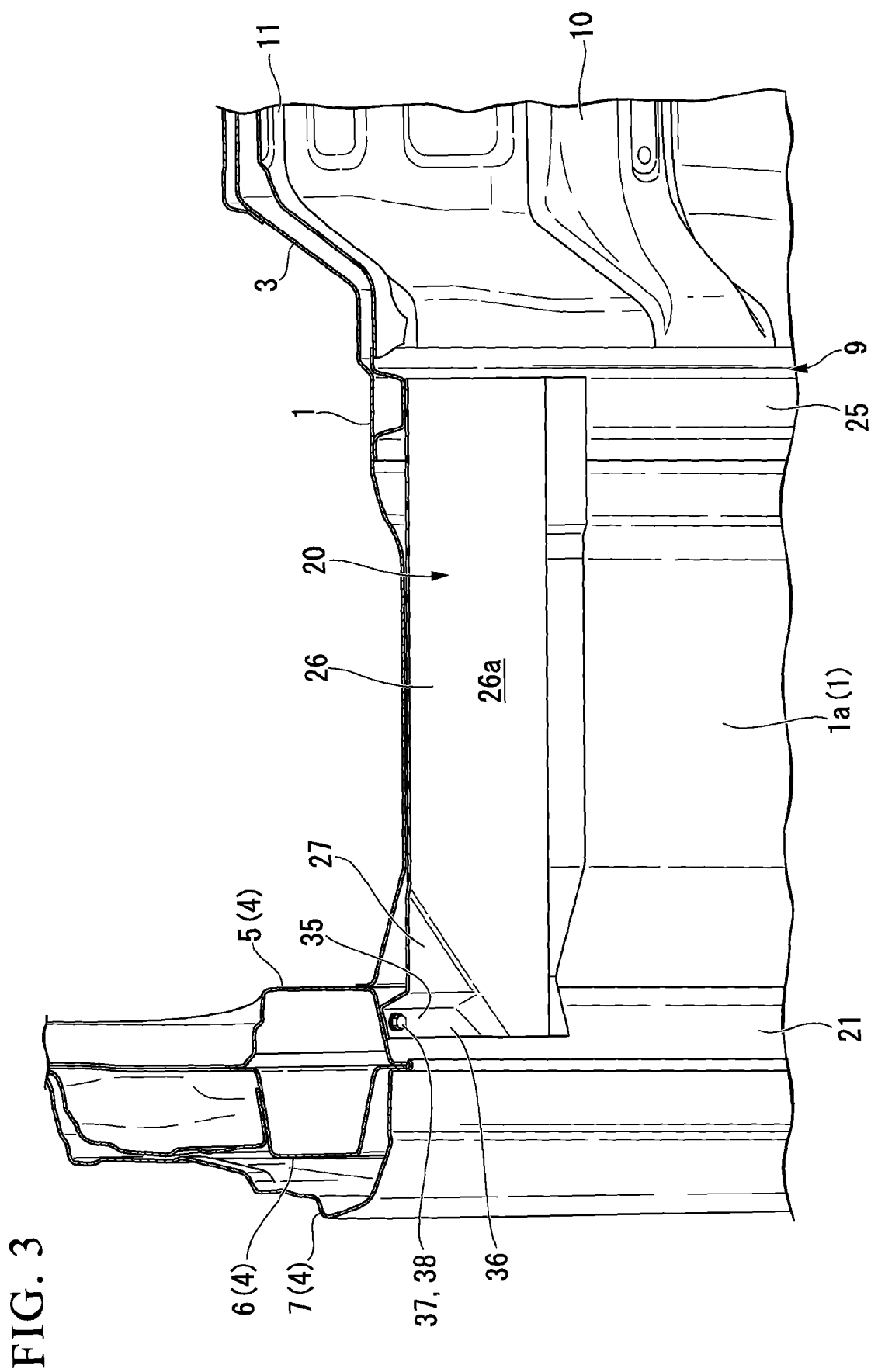
FIG. 3 is a partially cutaway perspective view of a relevant part of the present embodiment looking forward and upward from the bottom right.
Figure 4:
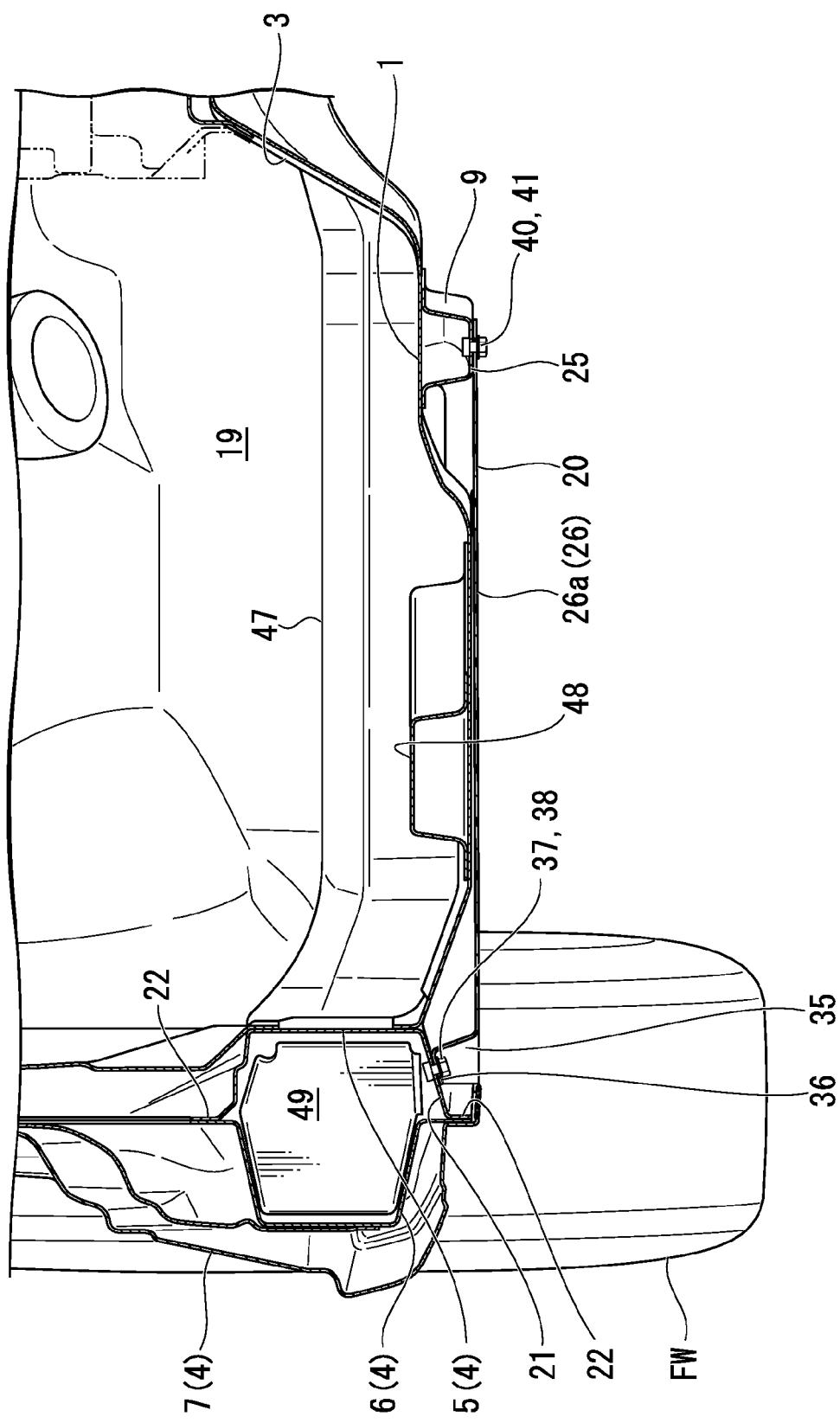
FIG. 4 is a sectional view along line A-A in FIG. 1.

As shown in FIG. 3 and FIG. 4, a fixing hole 38 for fixing the front outside edge of the under cover body 26 to the lower wall 21 of the inside sill 5 by a bolt 37, is provided in the bottom wall 36 of the front recessed section 35 of the front groove 27 of the under cover body 26.

Thus, the recessed section 35 and the recess 29 are formed in a concave shape at the outside edge of the under cover body 26, and the outside edge of the under cover body 26 is fixed to the lower wall 21 of each inside sill 5 by the bolt 37 inserted into the fixing hole 38 formed in the bottom wall 36 of the recessed section 35, and the bolt 33 inserted into the fixing hole 34 formed in the bottom wall 32 of the recess 29.

Moreover a fixing hole 41 for fixing the under cover body 26 to the lower wall 25 of the tunnel frame 9 by a bolt 40, is provided at the inner edge of the under cover body 26 at the center in the front-back direction of the vehicle body.

As shown in FIG. 4, a front cross member 47 is joined between the floor tunnel 3 of the front floor 1 and the side sill 4. Here, as described in FIG. 1, the side sill 4 is formed of the inside sill 5 having the hat-shaped sectional shape opened outward in the vehicle widthwise direction, the stiffener 6 having the hat-shaped sectional shape joined by the top and bottom flanges 22 of the inside sill 5 to form the closed cross-section structure and opened inward in the vehicle widthwise direction, and the outer panel 7 that covers the stiffener 6 from outside to constitute the side wall of the vehicle body.

A floor frame 48 that penetrates the front cross member 47 in the front-back direction of the vehicle body, is joined respectively to the left and right of the front floor 1. The front floor 1 is formed in such a manner that the outside portion thereof is bent upward along the way and joined to the bottom wall of the inside sill 5, and formed slightly upward at the arrangement position of the tunnel frame 9 on the front floor 1, and the height of the lower wall 25 of the tunnel frame 9 is matched with the height of the general surface 1*a* of the front floor 1. Accordingly, the general surface 26*a* of the under cover body 26 fitted over the lower wall 25 of the tunnel frame 9 and the lower wall 21 of the inside sill 5 can be formed flat overlapped on the general surface 1*a* of the front floor 1. A bulkhead 49 that blocks the closed cross-section structure formed of the inside sill 5 and the stiffener 6, is fitted to a portion of the closed cross-section structure.

Figure 5:
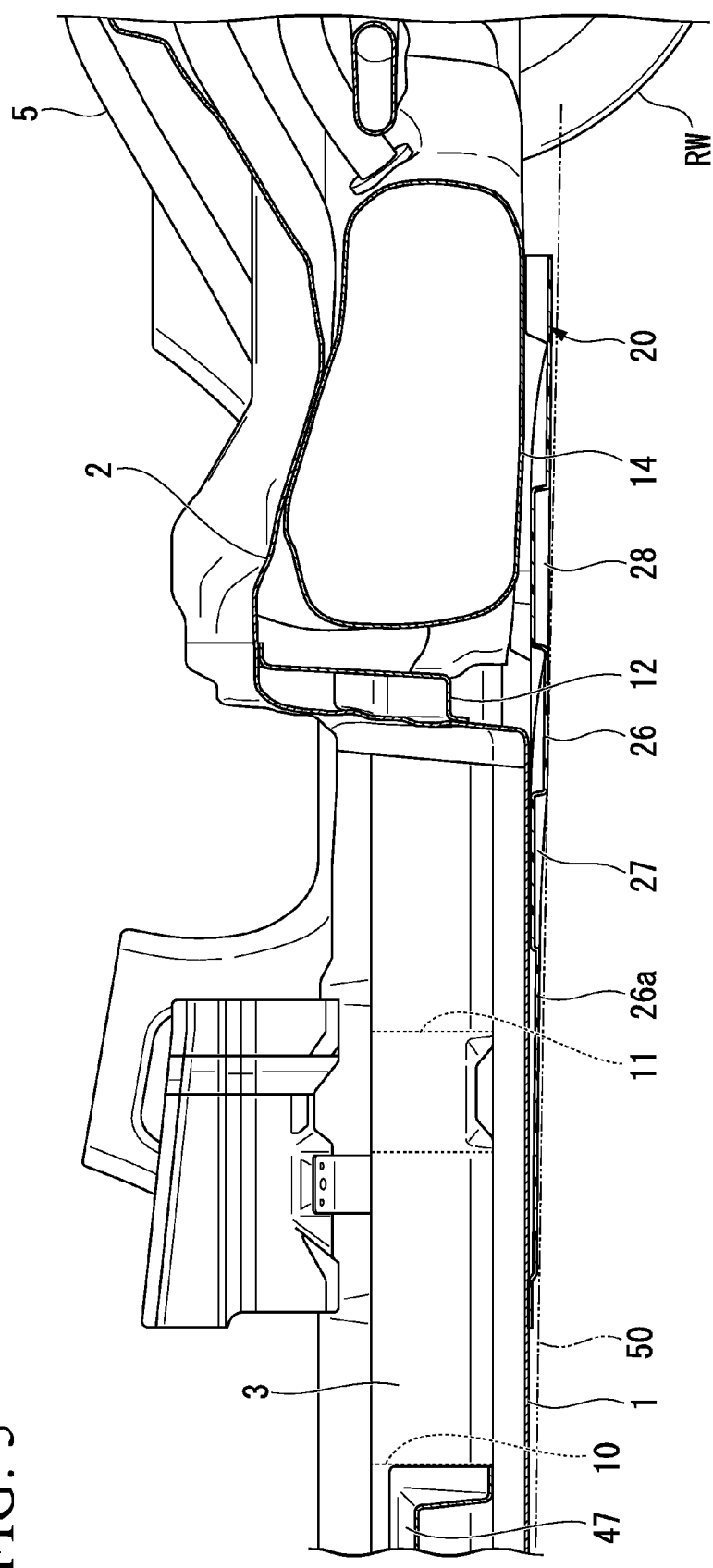
FIG. 5 is a sectional view along line B-B in FIG. 1.

As shown by the chain line in FIG. 5, the general surface 26*a* of the under cover body 26 is curved along an upwardly convex curved surface 50 from the front side toward the rear side of the vehicle body.

Figure 6:
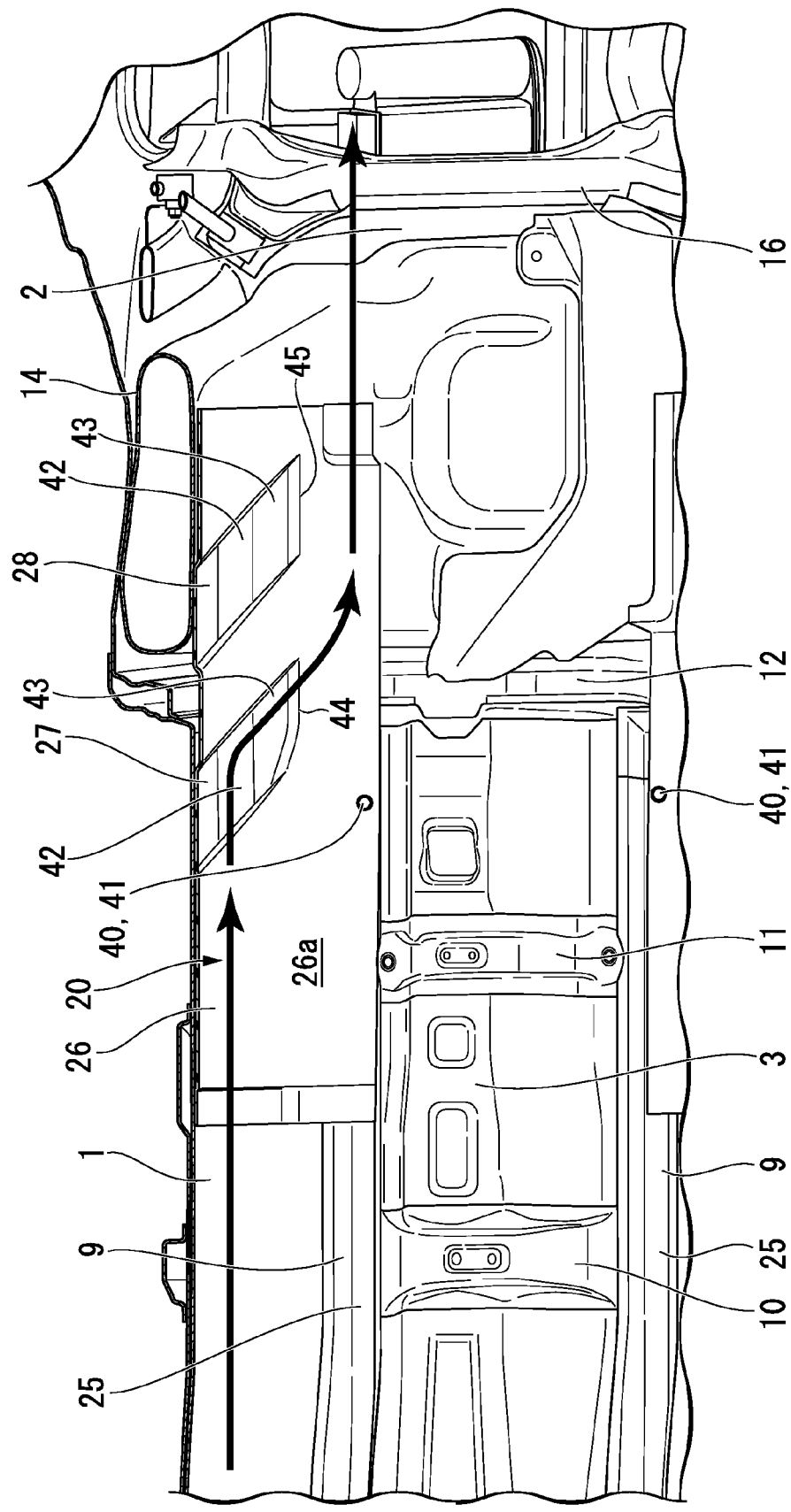
FIG. 6 is a partially cutaway perspective view of FIG. 5 as seen obliquely from below, which shows the flow of travel wind.

According to the present embodiment, because the general surface 1*a* of the front floor 1 and the general surface 26*a* of the under cover body 26 can be located close to the road surface, the air flowing from the front floor 1 to the vehicle-body under covers 20 at the time of travel of the vehicle becomes a straightened state from the general surface 1*a* of the front floor 1 toward the general surface 26*a* of the under cover body 26. When the air reaches reached the front groove 27 and the rear groove 28, it flows in a contracted state (refer to the arrow in FIG. 6) between the rear wheels RW along the front groove 27 and the rear groove 28, thereby enabling to avoid collision with the rear wheels RW, and decrease the air resistance. As a result, even if the position of the general surface 26*a* of the under cover body 26 is lowered as in the case in which the rectifying fin protrudes downward, because the element for rectification is the front groove 27 and the rear groove 28, which are grooves, the general surface 26*a* is not damaged, and the flow rate of the air flowing between the under cover body 26 the ground can be increased, thereby enabling to decrease the air resistance.

Figure 7:
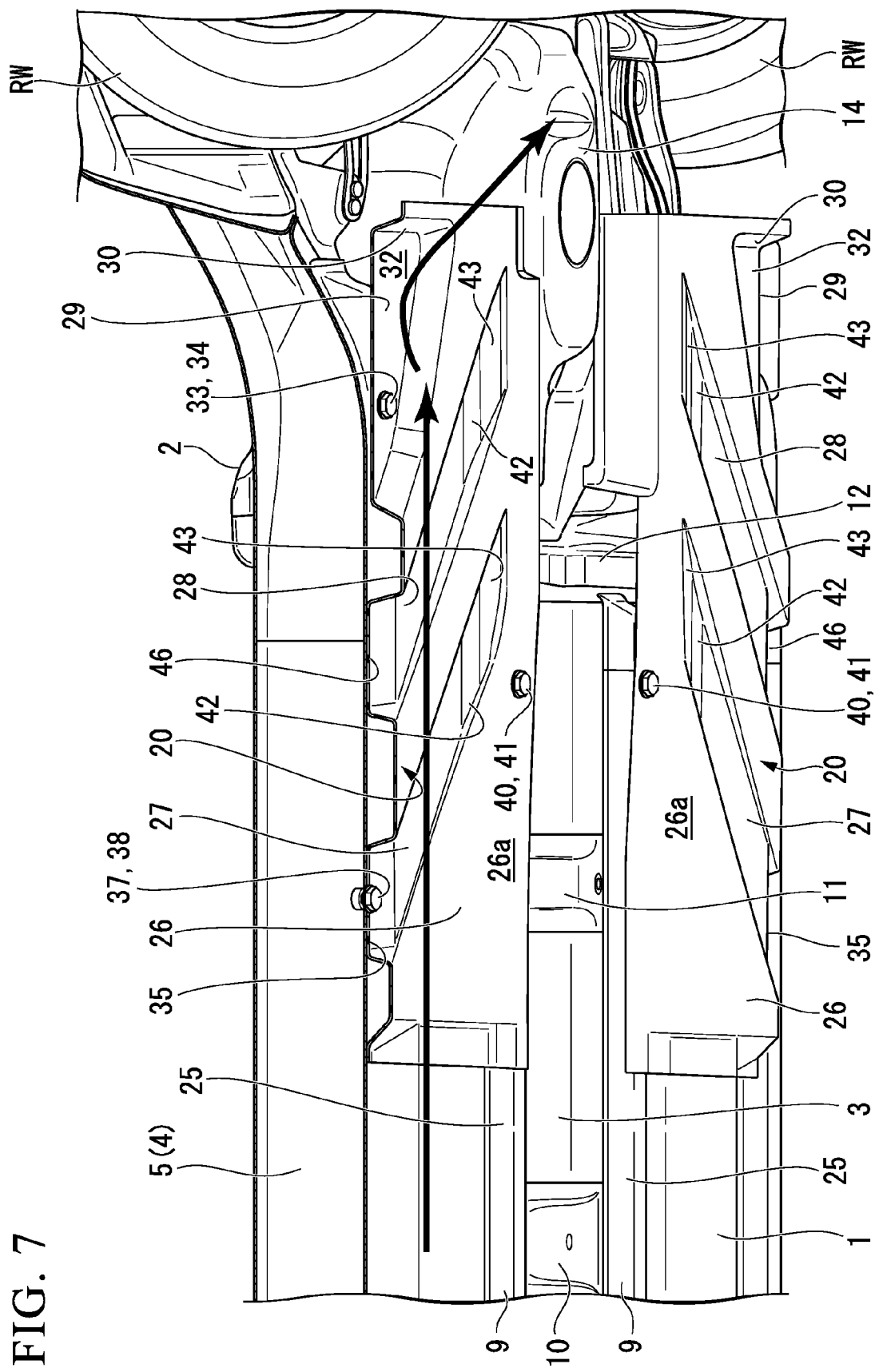
FIG. 7 is a perspective view showing another flow of travel wind corresponding to FIG. 6.

Moreover, when the air flowing under the general surface 26*a* of the under cover body 26 reaches the recess 29 without being guided into the front groove 27 and the rear groove 28, the air is guided to the rear wall 30 of the recess 29 as shown by the arrow in FIG. 7 and is guided downward of the rear wheels RW. Therefore a situation where the air flow collides with the front surface of the rear wheels RW is avoided, thereby enabling to suppress generation of turbulence, and decrease the air resistance. As a result, as with the front groove 27 and the rear groove 28, the recess 29 indented from the general surface 26*a* is not damaged, as compared to the case in which the rectifying fin and the like that protrude downward is fitted.

Specifically, because the general surface 26*a* of the under cover body 26 is curved along the upwardly convex curved surface 50, a portion in which the depth from the road surface increases from the front side toward the rear side can be formed, thereby improving the air introducing effect, and the air flow can be straightened by locating the general surface closer to the road surface by the increased depth.

Because the vehicle-body under covers 20 are provided at the rear half of the vehicle body in front of the rear wheels RW, the vehicle-body under covers 20 can be provided at a low cost, as compared to the case in which the vehicle-body under covers 20 are provided over the whole surface on the lower side of the front floor 1.

Moreover, a portion other than the bottom wall 36 of the recessed section 35 of the front groove 27 or the bottom wall 32 of the recess 29, which is a fixing portion with respect to the inside sill 5 of the side sill 4, can be positioned at a lower position close to the ground than the general surface 1*a* of the front floor 1. Therefore the flow rate of the air flow can be increased, giving an increase in the air resistance reduction effect.

The present invention is not limited to the above embodiment. For example, a fitting portion of the inside end of the under cover body 26 that fits to the tunnel frame 9 is not limited to one position. Moreover, the recessed section 46 of the rear groove 28 can be also fixed to the inside sill 5. Furthermore, the front groove 27, the rear groove 28, and the recess 29 can be molded as a separate body from the under cover body 26.

A case in which the matched pair of vehicle-body under covers 20 is formed spanning over the floor tunnel 3 has been described as an example. However, the left and right vehicle-body under covers 20 can be integrally formed to cover the underneath of the floor tunnel 3 as well.

As described above, the under covers for the vehicle body according to the present invention are attached to the lower surface of the vehicle body in such a manner that, as seen in the direction of travel of a vehicle, the under covers are arranged at positions in front of the rear wheels and in at least the rear half of the lower surface of the vehicle body. Recessed grooves are formed in pairs and are arranged so as to face each other across the widthwise center of the vehicle, and gradually approach closer to each other as they extend rearward in the direction of travel of the vehicle. Rear ends of these grooves are located between the left and right rear wheels and are directed to the widthwise center of the vehicle.

INDUSTRIAL APPLICABILITY

According to the present invention, under covers for a vehicle body can be provided in which the under cover body can be arranged at a low position, and the problem of interference of the rectifying element with the road surface can be resolved.

DESCRIPTION OF REFERENCE SYMBOLS

RW Rear wheel
20 Under covers for a vehicle body
26 Under cover body
27 Front groove (groove)
28 Rear groove (groove)
29 Recess
30 Rear wall
35, 46 Recessed section (concave-shaped portion)
1 Front floor (floor panel)
36 Bottom wall
32 Bottom wall
4 Side sill

The invention claimed is:

1. Under covers for a vehicle body, attached to a lower surface of the vehicle body in such a manner that, as seen in a direction of travel of a vehicle, the under covers are arranged at positions in front of rear wheels and in at least a rear half of a lower surface of the vehicle body, wherein recessed grooves are formed in pairs in a surface of an under cover body that faces a road surface, and are arranged so as to face each other across a widthwise center of the vehicle, and gradually approach closer to each other as they extend rearward in the direction of travel of the vehicle, and rear ends of these grooves are located between the left and right rear wheels and are directed to the widthwise center of the vehicle.

2. Under covers for a vehicle body according to claim 1, wherein a recess is formed in the surface of the under cover body that faces the road surface, at a position in front of the rear wheels, and a rear wall of the recess is formed so as to be along an outer periphery of the rear wheels.

3. Under covers for a vehicle body according to claim 1, wherein the under cover body is curved so as to be upwardly convex from a front side of the vehicle body toward a rear side.

4. Under covers for a vehicle body according to claim 1, wherein the under cover body is attached to the rear half of the lower surface of the vehicle body in front of the rear wheels, that is continuous to a flat floor panel attached to a front half of the lower surface of the vehicle body in front of the rear wheels.

5. Under covers for a vehicle body according to claim 1, wherein a concave-shaped portion is formed at an outside edge of the under cover body, and a bottom wall of the concave-shaped portion is fixed to a side sill of the vehicle as a fixing portion.

* * * * *